Aug. 23, 1960    J. H. BERTIN ET AL    2,949,734
REMOVABLE GRATE FOR JET DEFLECTION
Filed July 5, 1955    4 Sheets-Sheet 2

INVENTORS
JEAN H. BERTIN, HENRI TURINETTI
HENRI L. P. MEULIEN AND LOUIS A. BAUGER

By Watson, Cole, Grindle & Watson

ATTORNEYS

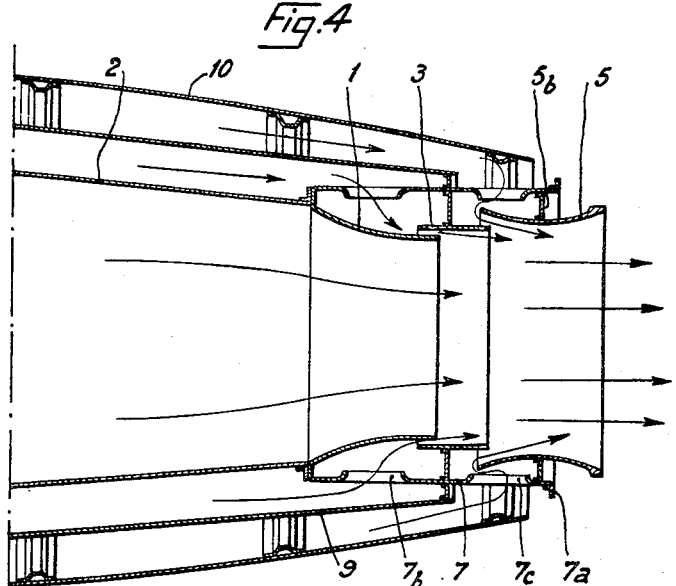
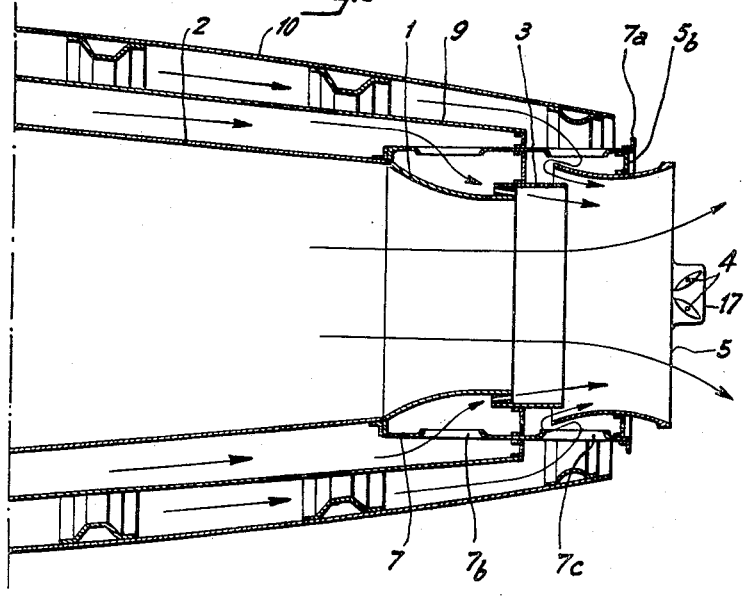

Aug. 23, 1960     J. H. BERTIN ET AL     2,949,734
REMOVABLE GRATE FOR JET DEFLECTION
Filed July 5, 1955     4 Sheets-Sheet 4

INVENTORS
JEAN H. BERTIN, HENRI TURINETTI
HENRI L. P. MEULIEN AND LOUIS A. BAUGER

By Watson, Cole, Grindle & Watson
ATTORNEYS

United States Patent Office 2,949,734
Patented Aug. 23, 1960

2,949,734
REMOVABLE GRATE FOR JET DEFLECTION

Jean H. Bertin, Neuilly-sur-Seine, Henri Turinetti, Paris, Henri L. P. Meulien, Courbevoie, and Louis A. Bauger, Vanves, France, assignors to Societe Nationale d'Etude et de Construction de Moteurs d'Aviation, Paris, France, a French company Filed July 5, 1955, Ser. No. 520,067

Claims priority, application France July 27, 1954

1 Claim. (Cl. 60—35.6)

Jet deflectors and thrust spoilers are already known which comprise the combination of two or three of the following components:

(1) Means for causing a modification in the stream which flows through the nozzle or issues therefrom, for example a solid or fluid obstacle intercepting part of the flow;

(2) A deflecting edge connected directly, or through an ejector duct, with the propulsion nozzle, this edge permitting a controlling and furthering of the effect of the first component;

(3) A grate of vanes adapted to receive the jet, the deflection of which has been initiated to guide it towards the desired direction, said grate being disposed so as not to intercept the jet under normal running conditions.

Such thrust spoilers are necessary, in particular, for braking an aircraft landing on an icy or snowy runway, the conventional brakes being in such a case inoperative. However, these spoilers may be a nuisance since they increase the weight and hinder the performances of the aircraft.

The present invention has for its object to provide a jet deflector device, the components of which may be easily disassembled, partly or wholly.

Other objects and advantages of the present invention will appear in the following description given by way of example with reference to the accompanying drawings in which:

Figs. 4, 5 and 6 are sections similar to that of Fig. 1, but showing the deflector after removal of the various components.

Figure 1:
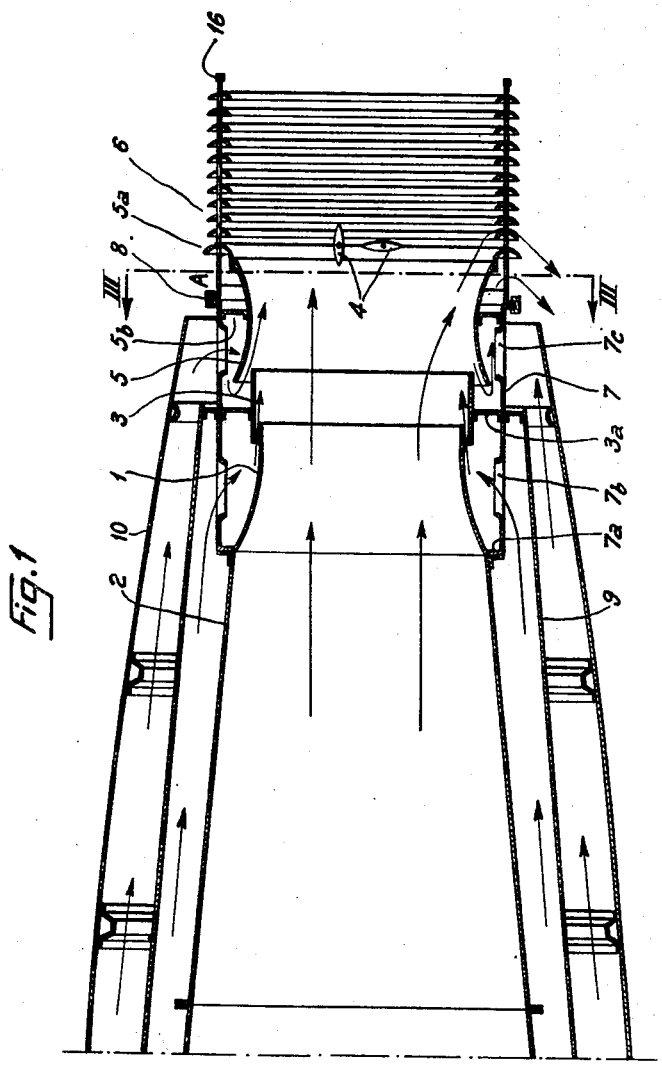
Fig. 1 is a diagrammatic axial section of the rear part of a jet turbine engine equipped with an improved deflecting device.

On the drawing, the exhaust nozzle of a jet turbine unit is seen at 1, and at 2 a duct connecting that nozzle to the turbine exhaust (not shown on drawing). Around the outlet of the nozzle 1 is disposed the collar 3 which acts as an ejector, same being used to suck up cooling air between the jet engine casing and a metal sheet 9, to protect the nacelle 10 from thermic radiations.

The deflecting device positioned beyond that collar comprises in succession along the gas flow direction: an annular convex surface or deflecting edge designed for guiding the boundary part of the jet during deflection (see lower half of Fig. 1) and a set of annular vanes 6 spaced along and extending around the normal undeflected path of the jet.

In the illustrated example, the deflecting edge comprises two separate parts: the first part 5 with a relatively small curvature is fast with the jet unit, while the second part 5a with a greater curvature, against which the boundary part of the jet is urged with the desired deflection, is assembled to the jet unit so as to be easily removable together with the vanes 6 as described hereafter.

Fixation of part 5 to the jet unit is made through a radial sheet metal web 5b binding this part to the cylinder 7. This cylinder 7 extends around the collar 3 and terminates in a flange 7a (Figure 1), through which said cylinder is attached to a flange connecting nozzle 1 to duct 2. That cylinder also bears collar 3 through a radial sheet-metal web 3a (Figure 1). A hole ring drilled in said cylinder ahead of sheet-metal web 3a is used for the passage of cooling air sucked in by the ejector effect of collar 3. Part 5, which is separated by an annular spacing from collar 3, also defines an ejector for sucking in air under jet action in the annular space between metal sheet 9 and duct 10. The cylinder 7 bears a second hole ring 7c for passage of this air which, under non-deviating conditions, prevents jet gases from adhering to the deviation edge. The radial sheet-metal web 5b is drilled to permit passage of gases sent back when there is deviation (lower half to Figure 1).

The deviation starting device is a solid removable obstacle exemplified in Figure 1 by two profiled blades 4 placed side by side parallel to a nozzle diameter. These blades pivot at their ends on a fixed bearing and are connected to a control mechanism which permits placing them either in the position shown in the upper half of Figure 1, in which case the jet comes out of the nozzle without deviation, or in the position shown in the lower half of Figure 1, in which case the jet is deviated on each side of the blades, from whence it hangs on the deviation edge and then goes through the channels located between paddles 6 to be deviated at a substantial angle.

Part 5a of the deviation edge and paddles 6 are supported by a ring 11, which is fixed to the cylinder external end 7 so as to be removable.

In the embodiment shown in the drawings, ring 11 comprises a cylindrical part 11a which fits in cylinder 7. It has, furthermore, a flange 11b which is tied to flange 7a of the cylinder 7 by an external U-shaped ring 8.

Figure 3:
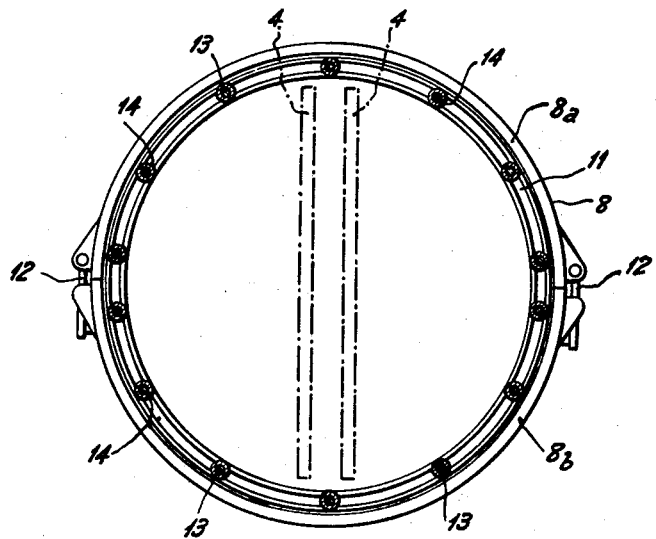
Fig. 3 is a cross-section through the line III—III of Fig. 1 on a slightly larger scale.

Figure 3 shows such a ring in two halves 8a, 8b, tied together by screw-stretchers 12. Tightening of the stretchers 12 assures fixation of ring 11 and its paddles to cylinder 7. On the contrary, loosening of said stretchers permits removal of ring 8 and disconnection from the cylinder 7 of the assembly comprising ring 11 and its associated portion.

Figure 2:
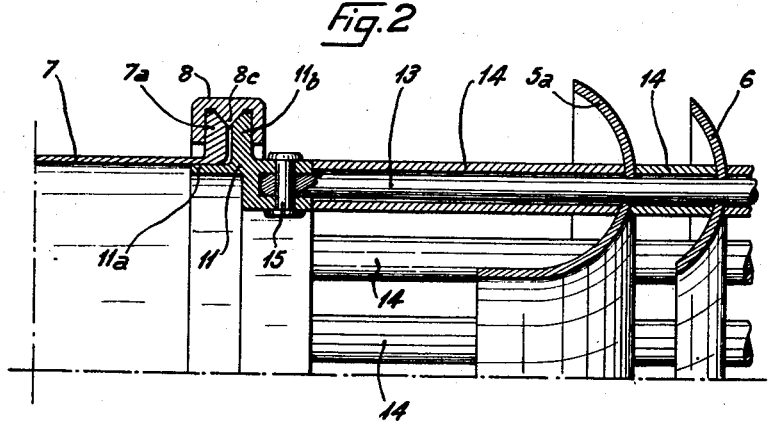
Fig. 2 shows the detail A of Fig. 1 on a larger scale.

Figure 2 shows that ring 8 comprises a central V-shaped projection 8a, which cooperates with the beveled edges of flanges 7a and 11b, and permits obtaining enough clearance between the two flanges to permit an easy assembling of ring 8, in spite of the thermic deformations of the parts. Furthermore, an advantage of this device is that the thrust on paddles 6, under jet deviating conditions, is borne by a bearing surface which is perpendicular to that thrust.

In the drawings, part 5a of deviation edge and paddles 6 are tied to ring 11 through tie-rods 13, on which those paddles are supported, as well as by small spacers 14. At one end, each tie-rod has a buckle bound to ring 11 by a rivet 15 and the other end is threaded to receive nuts 16, which keep the paddles and spacers on tie-rods.

In the illustrated embodiment of Figures 1 and 4, the pivoting blades 4 constituting the obstacle are disposed to pivot on part 5a of the deviation edge, so that removal of ring 8 results in an unobstructed exhaust nozzle as seen in Figure 4.

In the embodiment of Figure 5, blades 4 pivot at each end on a small bearing 17 built in the fixed part of the deviation edge so that those blades stay in place after removal of the paddles and make possible the obtaining of a small jet deviating effect.

Figure 6:
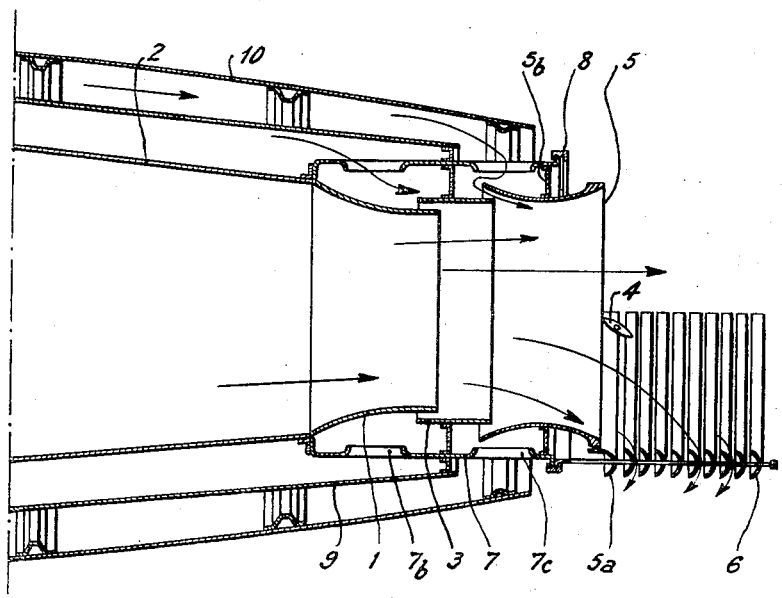

Finally, the variant embodiment of Figure 6 discloses a structure in which the removable rear part of the deviation edge, as well as paddles 6, are made of half rings, so that it is possible to remove only half of the rear part of the deviation edge and paddles. Deviation can take place only on half of the jet which changes the thrust direction and permits a directional effect on the aerodyne.

It is understood that modifications can be adapted to the above described embodiment, especially by substituting equivalent means without in any manner departing from the spirit or scope of the present invention.

What we claim is:

A fastening device for securing a rigid vane assembly to the rear of the outlet nozzle of a jet propulsion engine, comprising an outwardly projecting annular flange for fixed connection to the nozzle and having a planar front face disposed in a radial plane and an inclined rear face cut in a bevel, an outwardly projecting annular flange for fixed connection to the vane assembly and having a planar rear face disposed in a radial plane parallel to the planar front face of the former flange and an inclined front face cut in a bevel of opposite inclination to the inclination of the bevelled rear face of said former flange, a ring made of at least two arcuate sections and having two inwardly projecting end sides in radial planes and bearing against the planar faces of said flanges and an inwardly directed central projection of V-shaped section, the faces of which have the same inclination as that of the bevelled faces of said flanges to engage the same, and tightening means joining the said arcuate sections of the ring and extending tangentially to said ring for drawing said sections radially toward each other.

References Cited in the file of this patent

UNITED STATES PATENTS

| | | |
|---|---|---|
| 2,424,436 | Crater | July 22, 1947 |
| 2,452,219 | Bergvall et al. | Oct. 26, 1948 |
| 2,653,836 | Christophersen et al. | Sept. 29, 1953 |
| 2,793,494 | Kadosch et al. | May 28, 1957 |

FOREIGN PATENTS

| | | |
|---|---|---|
| 517,529 | Belgium | Feb. 28, 1953 |
| 1,060,291 | France | Nov. 18, 1953 |
| 433,895 | Germany | Sept. 13, 1926 |